United States Patent [19]
Obara

[11] Patent Number: 5,808,388
[45] Date of Patent: Sep. 15, 1998

[54] ELECTRIC DRIVE MOTOR WITH A COMPOUND BEARING ASSEMBLY

[75] Inventor: Rikuro Obara, Kitasaku-gun, Japan

[73] Assignee: Minebea Kabushiki-Kaisha, Nagano-ken, Japan

[21] Appl. No.: 694,233

[22] Filed: Aug. 8, 1996

[30] Foreign Application Priority Data

Aug. 9, 1995 [JP] Japan ................................. 7-224763

[51] Int. Cl.⁶ .............................. H02K 5/16; F16C 33/60; B23P 15/00
[52] U.S. Cl. ............................. 310/90; 384/510; 384/504; 384/520; 29/898.06; 29/898.07; 29/898.09
[58] Field of Search ............................... 310/90; 384/499, 384/504, 506, 510, 512, 517, 520; 29/898.06, 898.07, 898.09

[56] References Cited

U.S. PATENT DOCUMENTS

| | | | |
|---|---|---|---|
| 2,825,200 | 3/1958 | Boullion | 310/90 |
| 3,826,545 | 7/1974 | McKee | 308/189 R |
| 4,934,843 | 6/1990 | Nakamishi | 384/613 |
| 5,106,210 | 4/1992 | Chi | 384/545 |
| 5,160,866 | 11/1992 | Hishida et al. | 310/90 |
| 5,509,198 | 4/1996 | Takamizawa et al. | 29/898.09 |
| 5,510,661 | 4/1996 | Yoshimura et al. | 310/90 |
| 5,556,209 | 9/1996 | Obara et al. | 384/504 |

*Primary Examiner*—Thomas M. Dougherty
*Assistant Examiner*—Tran N. Nguyen
*Attorney, Agent, or Firm*—Lowe Hauptman Gopstein Gilman & Berner

[57] ABSTRACT

A first outer race ring 3, a sleeve-like spacer 7, a plurality of first balls 4, a conventional ball bearing unit 5 and a stepped-diameter shaft 1 are assembled into a compound bearing assembly by a bearing maker to enable a user or motor manufacturer to be free from a cumbersome assembling work of the bearing assembly. Consequently, upon receipt of the bearing assembly, the motor manufacturer may immediately mount the bearing assembly in a central hub portion of a rotor of the motor in an insertion manner to complete his product, i.e., high-performance motor.

2 Claims, 2 Drawing Sheets

ELECTRIC DRIVE MOTOR WITH A COMPOUND BEARING ASSEMBLY

BACKGROUND OF THE INVENTION

1. Field of the Invention

The present invention relates to an electric drive motor with a compound bearing assembly used in rotating portions of a computer and its peripheral devices.

2. Description of the Prior Art

In the motor used in the computer and its peripheral devices, the bearing assembly is mounted between a motor shaft and a hub portion of a rotor.

In a conventional type of the compound bearing assembly, as shown in FIG. 4(a), a pair of conventional ball bearing units A, B and a sleeve-like spacer C are separately produced and delivered to a user such as a motor manufacturer who in turn mounts these delivered components A, B, C on a motor shaft D of an electrical drive motor to assemble a compound bearing assembly, as shown in FIG. 4(b).

As described above, in the conventional bearing assembly, it is necessary for the user to mount the pair of the conventional ball bearing units A, B and the spacer C on the motor shaft D in a condition in which the ball bearing units A, B are spaced apart from each other through the spacer C. Consequently, the conventional bearing assembly suffers from the following problems:

(a) While keeping a sufficient rigidity, the motor shaft D is required to be sized in outer diameter so as to engage with the inner race rings of the ball bearing units A, B;

(b) Since the spacer C is a separate component independent of the pair of the ball bearing units A and B, it is necessary for the spacer C to have its opposite end surfaces improved in parallelism therebetween and also in flatness thereof, taken in connection with the dimensions of the ball bearing units A, B being assembled together with the spacer C;

(c) Since the spacer C is merely sandwiched between a pair of outer race rings of the ball bearing units A and B, it is necessary for the user to have the spacer C coaxially mounted on the motor shaft D with high accuracy;

(d) Unless all the above requirements are fulfilled, the motor suffers from vibrations, and, therefore is poor in performance.

SUMMARY OF THE INVENTION

It is an object of the present invention to solve the above problems by providing an electric drive motor with a compound bearing assembly in which a plurality of components of the bearing assembly are already assembled to release the user of the bearing assembly from its cumbersome assembling work, which enables the user to provide a high-performance electric drive motor.

According to a first aspect of the present invention, the above object of the present invention is accomplished by providing:

An electric drive motor with a compound bearing assembly comprising:

a stepped-diameter shaft provided with a large-diameter portion, a small-diameter portion and an annular inner raceway groove directly formed in an outer peripheral surface of the large-diameter portion of the stepped-diameter shaft;

a first outer race ring coaxially disposed around the large-diameter portion of the stepped-diameter shaft and spaced apart therefrom to form an annular space therebetween, the first outer race ring having its inner peripheral surface formed into an outer raceway groove;

a plurality of first balls rotatably mounted in the annular space defined between the annular inner raceway groove of the stepped-diameter shaft and the annular outer raceway groove of the first outer race ring;

a sleeve-like spacer which is provided with a pair of small-diameter portions in its opposite axial end portions and has one of its small-diameter portions fitted in the first outer race ring and the other fitted in a second outer race of a ball bearing unit which has its inner race ring mounted on the small-diameter portion of the stepped-diameter shaft, the sleeve-like spacer being coaxially disposed around the stepped-diameter shaft while spaced apart therefrom and axially extending between the first outer race and the second outer race of the ball bearing unit which is provided with a plurality of second balls between the inner race ring and the second outer race ring;

whereby the first outer race ring, the sleeve-like spacer, the plurality of first balls, the ball bearing unit and the stepped-diameter shaft are assembled into a compound bearing assembly;

the large-diameter portion of the stepped-diameter shaft having its base-end portion fixedly mounted on a base member of the motor at right angles; and the motor having a central hub portion of its rotor fixedly mounted on the compound bearing assembly in an insertion manner.

According to a second aspect of the present invention, the above object of the present invention is accomplished by providing:

The electric drive motor with the compound bearing assembly as set forth in the first aspect of the present invention, wherein:

an outer diameter of the inner race ring of the ball bearing unit in the compound bearing assembly is the same as that of the large-diameter portion of the stepped-diameter shaft; and an outer and an inner diameter of the second outer race ring of the ball bearing unit in the compound bearing assembly are the same as those of the first outer race ring, respectively;

whereby the first and the second balls are permitted to be the same in diameter.

DESCRIPTION OF THE PREFERRED EMBODIMENTS

Hereinbelow, the present invention will be described in detail with reference to the accompanying drawings.

Figure 1:
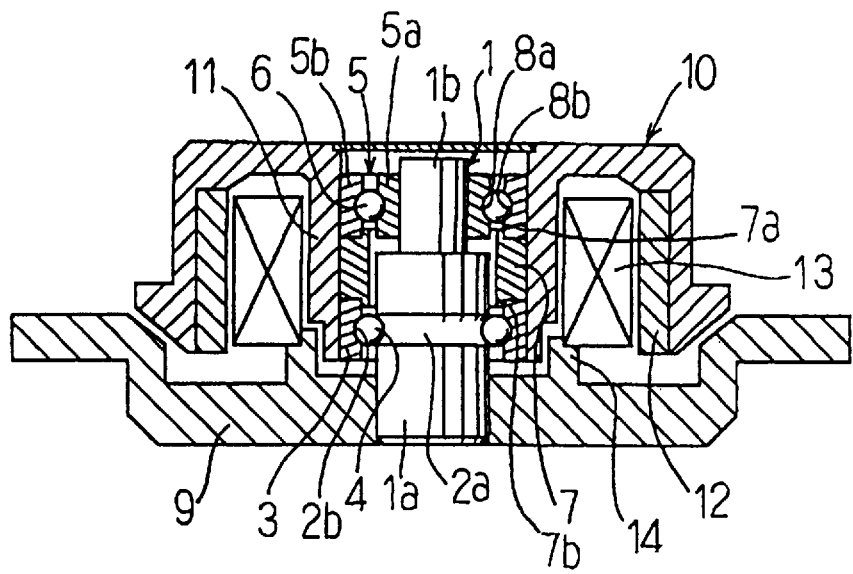
FIG. 1 is a longitudinal sectional view of an embodiment of the electric drive motor of an outer-rotor type with the compound bearing assembly, according to the present invention.
Figure 2:
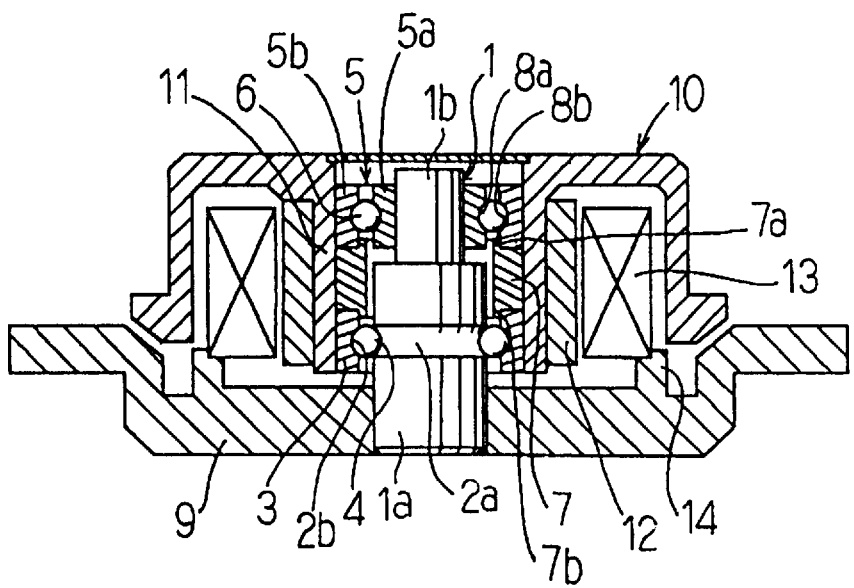
FIG. 2 is a longitudinal sectional view of an embodiment of the electric drive motor of an inner-rotor type with the compound bearing assembly, according to the present invention.
Figure 3:
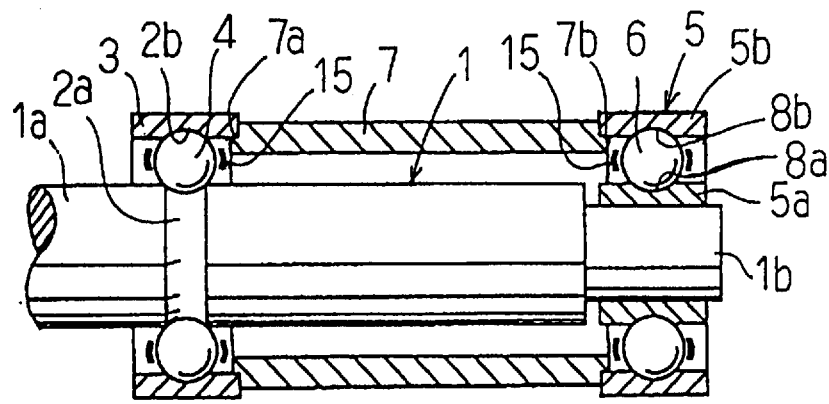
FIG. 3 is a longitudinal sectional view of the compound bearing assembly used in the electric drive motor of the present invention.
Figure 4A:
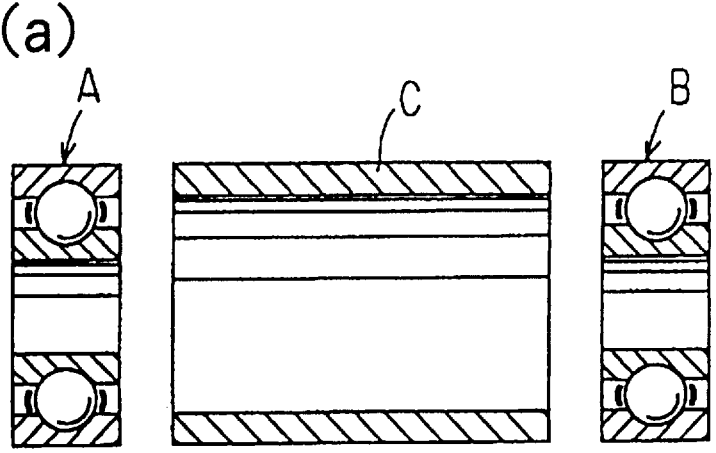
FIG. 4(a) is a longitudinal sectional view of the conventional bearing assembly still not assembled, illustrating separated ball bearing units and a spacer.
Figure 4B:
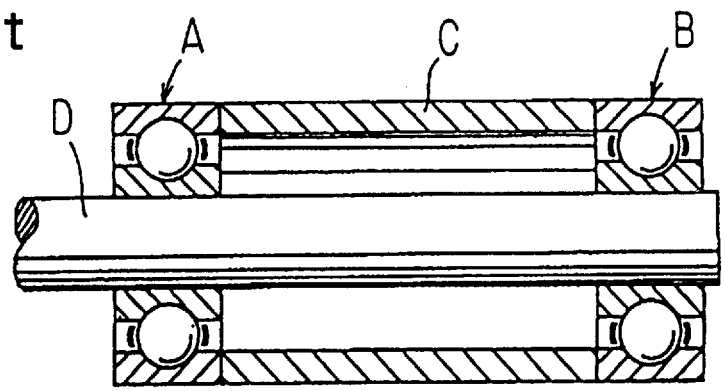
FIG. 4(b) is a longitudinal sectional view of the conventional bearing assembly after assembled, illustrating the ball bearing units and the spacer thus assembled on the motor shaft.

FIG. 1 shows an embodiment of an electric drive motor of the present invention of an outer-rotor type with a compound bearing assembly. On the other hand, FIG. 2 shows another embodiment of the electric drive motor of the present invention of an inner-rotor type with the compound bearing assembly. FIG. 3 shows the compound bearing assembly used in these motors of the present invention.

Now, referring to FIG. 3 illustrating the compound bearing assembly, the reference numeral 1 denotes a stepped-diameter shaft provided with a large-diameter portion 1a and a small-diameter portion 1b. Formed in an outer peripheral surface of the large-diameter portion 1a of the shaft (i.e., motor shaft) 1 is an annular inner raceway groove 2a.

A first outer race ring 3 is oppositely disposed from the inner raceway groove 2a of the large-diameter portion 1a of the shaft 1, and provided with an annular outer raceway groove 2b in its inner peripheral surface, so that a plurality of first balls 4 are rotatably mounted in a ball retainer 15 between the inner raceway groove 2a of the shaft 1 and the outer raceway groove 2b of the first outer race ring 3.

A conventional ball bearing unit 5, which is essentially constructed of an inner race ring 5a, a second outer race ring 5b and a plurality of second balls 6 rotatably mounted in a ball retainer 15 between these race rings 5a and 5b, has the inner race ring 5a fixedly mounted on the small-diameter portion 1b of the shaft 1 in an insertion manner.

A sleeve-like spacer 7 is coaxially arranged with the shaft 1 so as to cover the shaft 1, and is provided with a pair of small-diameter portions 7a, 7b in its axially opposite end portions. An outer diameter of each of the small-diameter portions 7a, 7b of the spacer 7 is so determined as to permit these small-diameter portions 7a and 7b to properly fit in the outer race rings 3 and 5b, respectively.

On the other hand, an outer diameter of the inner race ring 5a of the ball bearing unit 5 is equal to an outer diameter of the large-diameter portion 1a of the stepped-diameter shaft 1. Further, there is no difference in both outer and inner diameter between the second outer race ring 5b of the ball bearing unit 5 and the first outer race ring 3 of the large-diameter portion 1a of the shaft 1, so that all the balls 4, 6 are permitted to be the same in diameter.

In this embodiment of the electric drive motor of the present invention having the compound bearing assembly, the inner race ring 5a of the ball bearing unit 5 is slidably mounted on the small-diameter portion 1b of the stepped-diameter shaft 1 in an insertion manner, and has its outer end surface (i.e., right-hand side as viewed in FIG. 3) subjected to a predetermined axially inward pre-load. Under such circumstances, the inner race ring 5a of the ball bearing unit 5 is fixed to the small-diameter portion 1b of the stepped-diameter shaft 1 by means of a suitable adhesive and like connecting means. Thus the components such as the spacer 7, the first outer race ring 3 and the ball bearing unit 5 are successively mounted on the shaft 1 to complete the compound bearing assembly used in the electric drive motor of the present invention.

Incidentally, as is clear from FIG. 3, the balls 4, 6 are rotatably supported in the ball retainers 15, and travel in the annular inner and outer raceway grooves 2a, 2b, 8a and 8b of the compound bearing assembly of the motor of the present invention.

Although the balls 4, 6 are the same in diameter in the above embodiment of the present invention, it is also possible to use any other balls which are different in diameter from the balls 4, 6. In other words, the second balls 6 used in the small-diameter portion 1b of the shaft 1 may be different in diameter from the first balls 4 used in the large-diameter portion 1a of the shaft 1.

As shown in FIG. 1, the thus assembled compound bearing assembly having the above construction is then mounted in the electric drive motor of the present invention as follows:

Namely, first, the stepped-diameter shaft 1 has its base-end portion (i.e., lower-end portion as viewed in FIG. 1) fixedly mounted in a central bore of a base member 9 of the motor so that the shaft 1 extends upward from the base member 9 at right angles; and, then, a central hub portion 11 of a rotor 10 of the motor is fixedly mounted on the outer race rings 3, 5b of the compound bearing assembly in an insertion manner.

Incidentally, in FIG. 1: the reference numeral 12 denotes a permanent magnet; 13 an electrically energizing coil wound around a stator yoke (not shown) of the motor; and, 14 a yoke holder.

The above embodiment of the electric drive motor of the present invention is of an outer-rotor type. FIG. 2 shows the electric drive motor of the present invention of an inner-rotor type in which the permanent magnet 12 is fixedly mounted on an outer peripheral surface of the central hub portion 11 of the rotor 10.

In the electric drive motor of the present invention, since the compound bearing assembly thereof has the above construction, the following action and effects are obtained:

(1) Since the first outer race ring 3, first balls 4, spacer 7, ball bearing unit 5 and the stepped-diameter shaft 1 have been already assembled into the compound bearing assembly by a bearing manufacturer, the user or motor manufacturer is released from a cumbersome assembling work of the compound bearing assembly, the assembly being easily mounted inside a sleeve-like rotating element (i.e., central hub portion 11 of the rotor 10 of the motor) by inserting the assembly into the rotating element and fixing the assembly therein at the user's end;

(2) Since the compound bearing assembly used in the motor of the present invention uses the stepped-diameter shaft 1 provided with the large-diameter portion 1a which has its outer peripheral surface directly formed into the annular inner raceway groove 2a, it is possible for the compound bearing assembly to eliminate the conventional type inner race ring in the large-diameter portion 1a of the stepped-diameter shaft 1, which permits the shaft 1 to be partially increased in diameter, and, therefore improved in rigidity;

(3) Since the stepped-diameter shaft 1 is provided with the large-diameter portion 1a and therefore improved in rigidity, it is possible to increase the resonance point of the electric drive motor of the present invention having the compound bearing assembly, so that the motor with the compound bearing assembly may be prevented from resonating to the remaining components of the motor, whereby the motor of the present invention is improved in performance and reliability;

(4) The spacer 7 may be fabricated by a bearing maker or manufacturer so as to align with the ball bearing unit 5 and the first outer race ring 3 with high accuracy. Further, the spacer 7 has its small-diameter portion 7a and 7b fitted in the outer race rings 3 and 5b, respectively. In other words, these components 7, 4, 5b are firmly united. As a result, the spacer 7 may be coaxially arranged with the stepped-diameter shaft 1 with high accuracy, which enables the electric drive motor of the present invention with the compound bearing assembly having the above construction to considerably reduce the vibration and noise thereof in operation;

(5) The number of the conventional ball bearing units in the compound bearing assembly used in the motor of the present invention is only one which is the ball bearing unit 5. Consequently, the compound bearing assembly in the motor of the present invention uses only one inner race ring 5a, and is therefore reduced in the number of its components in comparison with the conventional bearing assemblies; and (6) Since the annular inner raceway groove 2a is directly formed in the outer peripheral surface of the large-diameter portion 1a of the shaft 1 in the motor of the present invention, no inner race ring is required in the large-diameter portion 1a of the shaft 1, which enables both the first outer race ring 3 and the spacer 7 of the compound bearing assembly used in the motor of the present invention to be downsized in outer diameter, and, therefore enables the motor of the present invention to be also downsized so as to meet the need in industry.

What is claimed is:

1. An electric drive motor with a compound bearing assembly comprising:

a stepped-diameter shaft (1) provided with a large-diameter portion (1a), a small-diameter portion (1b) and an annular inner raceway groove (2a) directly formed in an outer peripheral surface of said large-diameter portion (1a);

a first outer race ring (3) coaxially disposed around said large-diameter portion (1a) of said stepped-diameter shaft (1) and spaced apart therefrom to form an annular space therebetween, said first outer race ring (3) having its inner peripheral surface formed into an outer raceway groove (2b);

a plurality of first balls (4) rotatably mounted in said annular space defined between said annular inner raceway groove (2a) of said stepped-diameter shaft (1) and said annular outer raceway groove (2b) of said first outer race ring (3);

a sleeve-like spacer (7) which is provided with a pair of small-diameter portions (7a, 7b) in its opposite axial end portions and has one of its small-diameter portions (7b) fitted in said first outer race ring (3) and the other fitted in a second outer race ring (5b) of a ball bearing unit (5) which has its inner race ring (5a) mounted on said small-diameter portion (1b) of said stepped-diameter shaft (1), said sleeve-like spacer (7) being coaxially disposed around said stepped-diameter shaft (1) while spaced apart therefrom and axially extending between said first outer race ring (3) and said second outer race ring (5b) of said ball bearing unit (5) which is provided with a plurality of second balls (6) between said inner race ring (5a) and said second outer race ring (5b);

whereby said first outer race ring (3), said sleeve-like spacer (7), said plurality of first balls (4), said ball bearing unit (5) and said stepped-diameter shaft (1) are assembled into a compound bearing assembly;

said motor further comprising a base member (9), an electrically energizing coil (13) mounted on said base member (9), a rotor (10) and a permanent magnet (12) mounted on the rotor (10);

said large-diameter portion of said stepped-diameter shaft (1) having its base-end portion fixedly mounted on said base member (9) of said motor at right angles; and said motor having a central hub portion (11) of its rotor (10) fixedly mounted on said compound bearing assembly in an insertion manner.

2. The electric drive motor with the compound bearing assembly as set forth in claim 1, wherein:

an outer diameter of said inner race ring of said ball bearing unit in said compound bearing assembly is the same as that of said large-diameter portion of said stepped-diameter shaft; and an outer and inner diameter of said second outer race ring of said ball bearing unit in said compound bearing assembly are the same as those of said first outer race ring, respectively;

whereby said first and said second balls are permitted to be the same in diameter.

* * * * *